United States Patent
Hamilton

(10) Patent No.: US 11,750,410 B2
(45) Date of Patent: Sep. 5, 2023

(54) BROADCAST VPN SYSTEM

(71) Applicant: Mike Hamilton, Cleveland, OH (US)

(72) Inventor: Mike Hamilton, Cleveland, OH (US)

(*) Notice: Subject to any disclaimer, the term of this patent is extended or adjusted under 35 U.S.C. 154(b) by 0 days.

(21) Appl. No.: 17/826,256

(22) Filed: May 27, 2022

(65) Prior Publication Data

US 2022/0385495 A1    Dec. 1, 2022

Related U.S. Application Data

(60) Provisional application No. 63/194,235, filed on May 28, 2021.

(51) Int. Cl.
H04L 12/18 (2006.01)
H04L 12/46 (2006.01)

(52) U.S. Cl.
CPC ...... H04L 12/1845 (2013.01); H04L 12/4641 (2013.01); *H04L 12/1868* (2013.01)

(58) Field of Classification Search
CPC ............. H04L 12/1845; H04L 12/4641; H04L 12/1868
See application file for complete search history.

(56) References Cited

U.S. PATENT DOCUMENTS

| | | | | |
|---|---|---|---|---|
| 8,953,590 | B1* | 2/2015 | Aggarwal | H04L 12/4675 370/409 |
| 11,563,685 | B2* | 1/2023 | Branch | H04L 12/4641 |
| 2008/0250492 | A1* | 10/2008 | Hazard | H04L 63/0272 726/15 |
| 2016/0198020 | A1* | 7/2016 | Zhao | H04L 69/166 709/223 |
| 2017/0366416 | A1* | 12/2017 | Beecham | H04L 45/50 |
| 2017/0366445 | A1* | 12/2017 | Nemirovsky | H04L 45/121 |
| 2019/0018975 | A1* | 1/2019 | Goldfarb | H04L 63/14 |
| 2020/0272920 | A1* | 8/2020 | Liu | G06N 5/043 |
| 2020/0314212 | A1* | 10/2020 | Branch | H04L 12/4641 |
| 2021/0320871 | A1* | 10/2021 | Savarese | H04L 61/4511 |
| 2022/0377005 | A1* | 11/2022 | Vasseur | G06N 5/04 |

* cited by examiner

*Primary Examiner* — Blake J Rubin
(74) *Attorney, Agent, or Firm* — Brennan, Manna & Diamond, LLC

(57) ABSTRACT

The present invention relates generally to the field of virtual private networks. More specifically, the present invention relates to a broadcast system for a virtual private network that broadcasts via a mesh network. Further, the system makes use of a broadcast source server which allocates data from data packets to specific nodes within a location-based regiment database. The database then uses an AI optimization system which further minimizes latency versus standard IP UDP broadcast systems.

16 Claims, 5 Drawing Sheets

– 1 –
BROADCAST VPN SYSTEM

CROSS-REFERENCE TO RELATED APPLICATION

The present application claims priority to, and the benefit of, U.S. Provisional Application No. 63/194,235, which was filed on May 28, 2021 and is incorporated herein by reference in its entirety.

FIELD OF THE INVENTION

The present invention relates generally to the field of virtual private networks (VPN). More specifically, the present invention relates to a broadcast system for a VPN that broadcasts via a mesh network. Further, the system makes use of a broadcast source server that allocates data from data packets to specific nodes within a location-based regiment database. The database then uses an artificial intelligence (AI) optimization system that further minimizes latency versus standard IP UDP broadcast systems. Accordingly, the present disclosure makes specific reference thereto. Nonetheless, it is to be appreciated that aspects of the present invention are also equally applicable to other like applications, devices and methods of manufacture.

BACKGROUND

A virtual private network (VPN) creates a private network from a public internet connection such that a user's IP address is masked, and the user's web browsing is private and anonymous. VPNs work by creating a data tunnel between the user's local network and an exit node in another geographic location. This exit node in turn gives the appearance that a user is present at the node, even if the user is thousands of miles away. In addition, VPNs also use encryption to scramble data that passes through the network.

A mesh network is a group of devices that act as a single Wi-Fi network, wherein each device forms a Wi-Fi point which are connected and communicate to one another wirelessly without the need for a router or switch. As such, mesh networks provide flexible coverage in hard to cover areas, as well as providing data with a plurality of paths to get to its destination. Further, mesh networks can reroute data through another point should one point fail.

Therefore, there exists a long felt need in the art for a broadcast VPN system that reduces bandwidth requirements from the originating internet protocol broadcasting location, thereby reducing latency of the transmissions utilizing an AI optimization system, wherein the AI optimization system utilizes past performance data. There is also a long felt need in the art for a reverse VPN system that sends broadcasts to mesh networks. Additionally, there is a long felt need in the art for a reverse VPN system that utilizes a broadcast source server to break-up a data packet based on a destination R-node number and an L-Reg optimization algorithm. Finally, there is a long felt need in the art for a broadcast VPN system that is relatively inexpensive to manufacture and operate, and that is both secure and easy to use.

The subject matter disclosed and claimed herein, in one embodiment thereof, comprises a broadcast VPN system that functions as a secure reverse VPN system and that sends secure broadcasts to a mesh network. More specifically, the system comprises a broadcast server that sends data to individual nodes within a location-based regiment database, as well as an error-checking feature that enables the system to ensure that all data was received by the nodes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a broadcast VPN system. More specifically, the system utilizes a mesh network to send secure broadcasts of data via a VPN. The system is comprised of a broadcast source server, a plurality of individual nodes, and a location-based regiment database. Once data packets enter the system, the packets are broken up into individual data, which is then sent to the broadcast source server where it is assigned to individual nodes. Each node is further located within a location-based regiment database, which uses an AI optimization system to minimize latency and allows for the transmission/retransmission of data via the nodes. In a further embodiment of the present invention, the system comprises an error check process, wherein the broadcast source server ensures that no node is missing any data via an error hash process.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
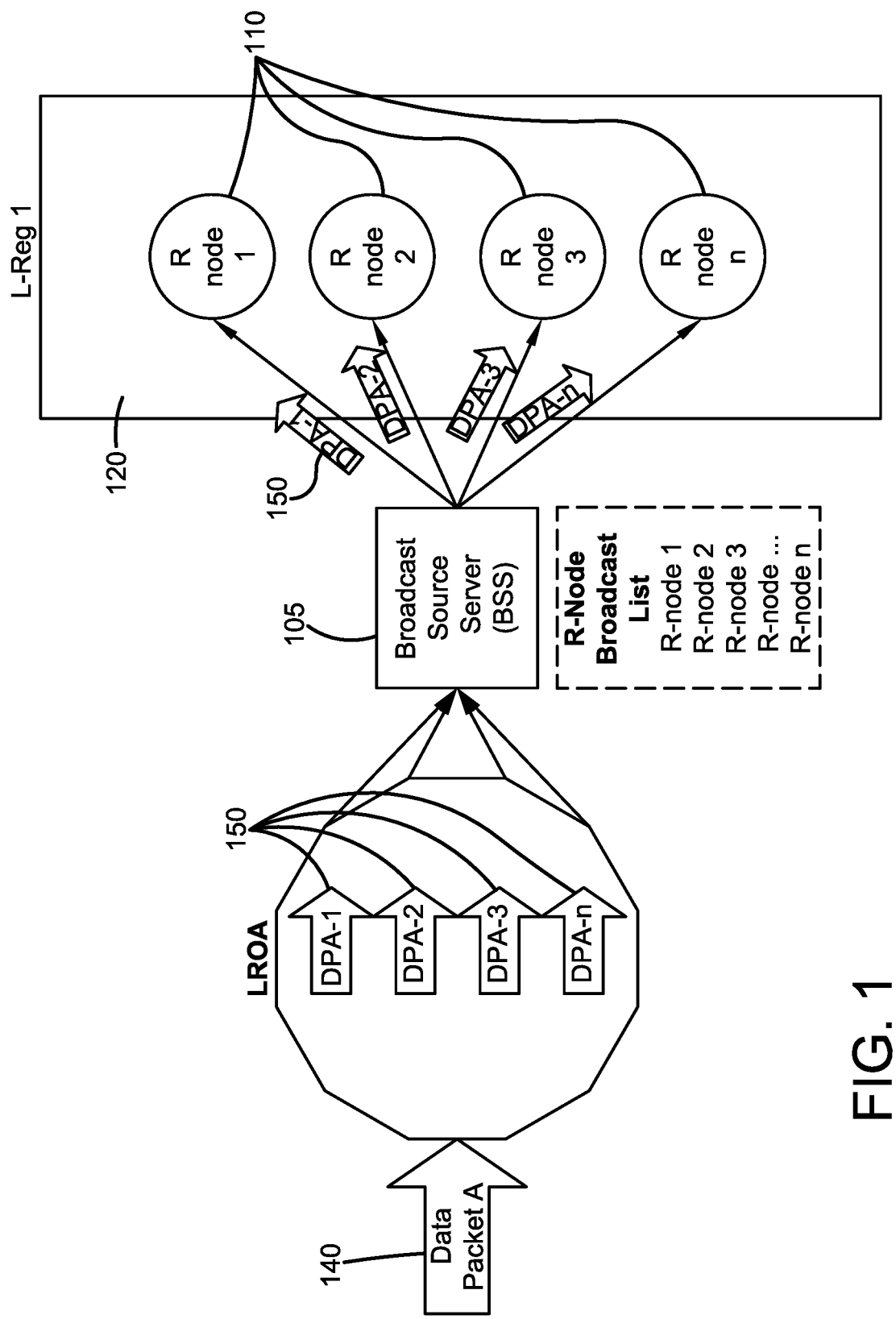
FIG. 1 illustrates a graphical representation of one potential embodiment of the broadcast VPN system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

Referring initially to the drawings, FIG. 1 illustrates a graphical representation of one potential embodiment of the broadcast VPN system 100 of the present invention in accordance with the disclosed architecture. The system 100 is comprised of at least one broadcast source server 105 that receives a plurality of data 150 from at least one data packet 140. The data 150 is received by at least one, but preferably a plurality of R-nodes 110 that continuously send performance metrics on R-node cohorts. The R-nodes 110 are located within the server 105. The server 105 also breaks up the data packet 140 into data 150 (DPA) that is then sent to a plurality of R-nodes 110 via an AI optimization system. The AI system is preferably located within the location-based regiment database 120 (L-reg). The AI optimization process further minimizes latency versus the latency typically experienced when utilizing standard IP UDP broadcast systems.

The AI system is a deep learning model that is continuously trained using live network data as well as synthetic data generated from network models. The system determines the most optimal local group (LG) packet size, density, latency, and security for the system 100. The AI system also optimizes LG size by determining the number of devices in local group and frequency of broadcast as well as density (the number of devices per size area), optimizes latency by varying the packet size based on density and other parameters, and optimizes security based on density and other parameters. It should be noted that for security purposes, the message traffic pattern within the system 100 is never the same between R-nodes 110. It is continuously changed and all R-Nodes 110 never use the same R-Nodes 110 for retransmission of data through the system.

Figure 2:
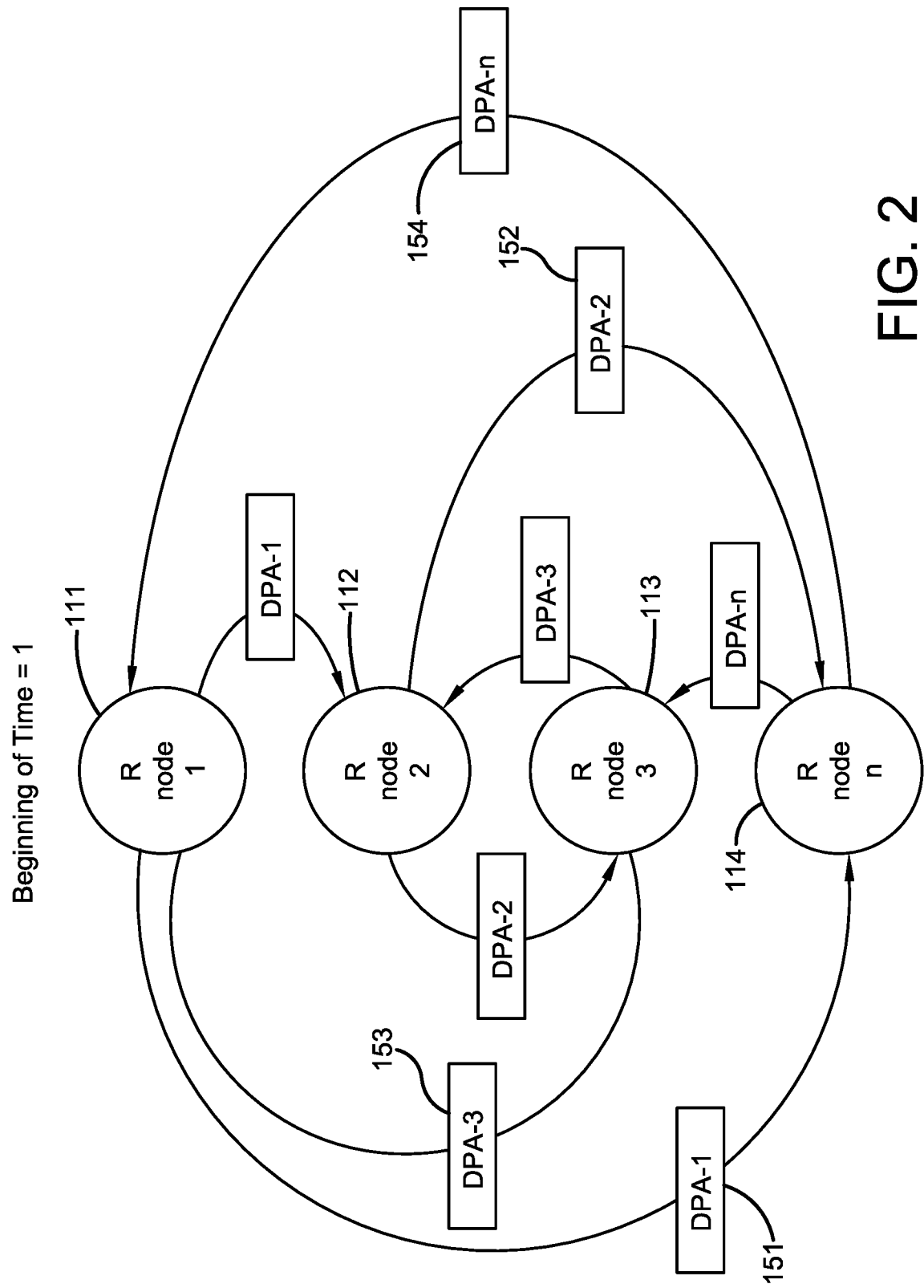
FIG. 2 illustrates a graphical representation of one potential embodiment of the broadcast VPN system of the present invention at beginning of time=1 in accordance with the disclosed architecture.

FIG. 2. illustrates a graphical representation of one potential embodiment of the broadcast VPN system 100 of the present invention at beginning of time=1 in accordance with the disclosed architecture. More specifically, at time=1, R-Node 1 (111) receives DPA-1 (151), R-Node 2 (112) receives DPA-2 (152), R-Node 3 (113) receives DPA-3 (153), and R-Node n (114) receives DPA-n (154). Then, R-Node 1 (111) retransmits DPA-1 (151) to R-Node 2 (112) and R-Node n (114) based on the optimized AI algorithm of the L-Reg 120. Next, R-Node 2 (112) retransmits DPA-2 (152) to R-Node 3 (113) and R-Node n (114) based on the optimized algorithm of the L-Reg 120. Further, R-Node 3 (113) retransmits DPA-3 (153) to R-Node 2 (112) and R-Node 1 (111) based on the optimized algorithm of the L-Reg 120. Finally, R-Node n (114) retransmits DPA-n (154) to R-Node 1 (111) and R-Node 3 (113) based on the optimized algorithm of the L-Reg 120. At this point, R-Node 1 (111) still requires DPA-2 (152), R-Node 2 (112) still requires DPA-n (154), R-Node 3 still requires DPA-1 (151), and R-Node n (114) still requires DPA-3 (153).

Figure 3:
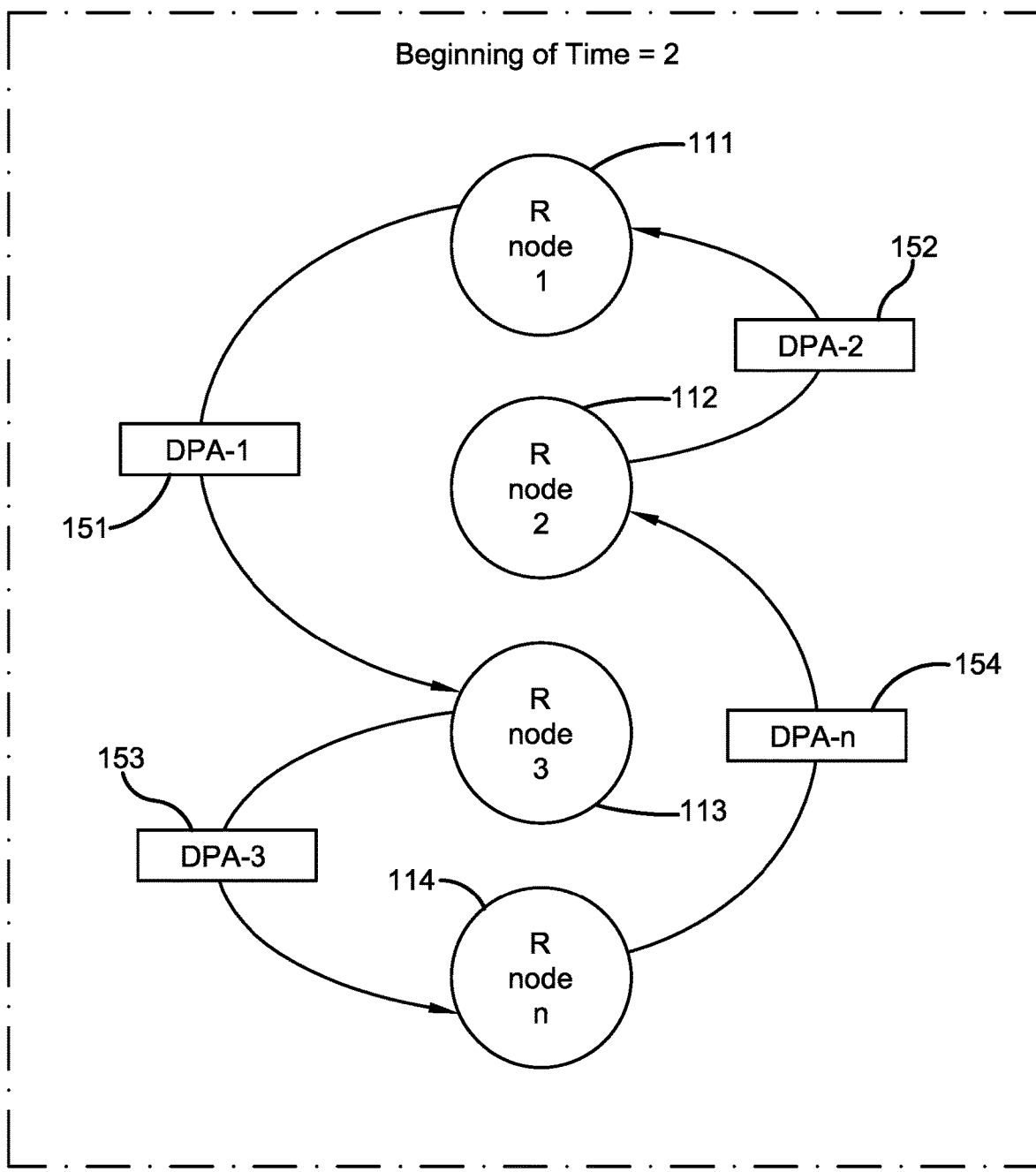
FIG. 3 illustrates a graphical representation of one potential embodiment of the broadcast VPN system of the present invention at beginning of time=2 in accordance with the disclosed architecture.

FIG. 3. illustrates a graphical representation of one potential embodiment of the broadcast VPN system 100 of the present invention at beginning of time=2. First, R-Node 1 (111) retransmits DPA-1 (151) to R-Node 3 (113) based on the optimized algorithm of the L-Reg 120. Then, R-Node 2 (112) retransmits DPA-2 (152) to R-Node 1 (111) based on the optimized algorithm of the L-Reg 120. Further, R-Node 3 (113) retransmits DPA-3 (153) to R-Node n (114) based on the optimized algorithm of the L-Reg 120. Finally, R-Node n (114) retransmits DPA-n (154) to R-Node 2 (112) based on the optimized algorithm of the L-Reg 120.

Figure 4:
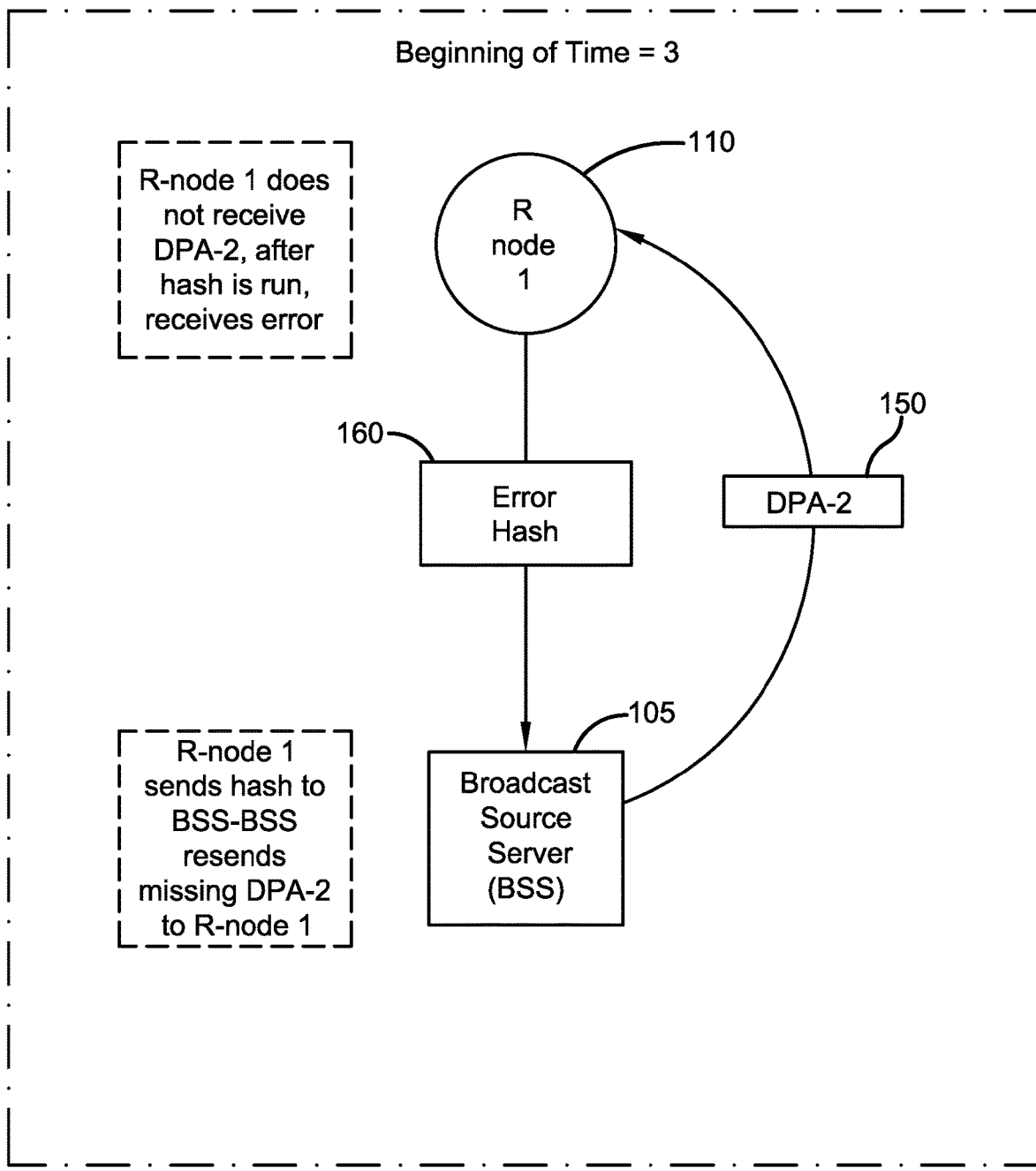
FIG. 4 illustrates a graphical representation of one potential embodiment of the broadcast VPN system of the present invention at beginning of time=3 during an error check in accordance with the disclosed architecture.

FIG. 4. illustrates a graphical representation of one potential embodiment of the broadcast VPN system 100 of the present invention at beginning of time=3 during an error check. By way of example, the system 100 will perform an error check when R-Node 1 (111) does not receive DPA-2 (152) after it has run, and thus receives an error. Each DPA packet 140 contains the hash of an entire DPA such that each node 110 hashes a message and compares the last 8 char of hash. If the current message and the last 8 char of hash match, then the system 100 confirms each R-Node (111,112, 113,114) contains each total packet 140. If they do not match, the respective R-Node (in the figure, R-Node 1 (111)) transmits hash hexadecimal characters to the broadcast source server 105. The server 105 contains a list of all possible combinations of 8 hash char possible and can then therefore retransmits the missing DPA-portion (in the figure, DPA-2 (152)) back to the respective node (in the figure, R-node 1 (111)). Therefore, the system ensures all R-Nodes 110 have the full broadcast messages from each data packet 140.

In practice, the system 100 reduces latency to a minimum by using all R-nodes 110 of the system to broadcast data packets 140, even if all R-nodes 110 are not receiving said data packets 140 for media consumption. In this manner, the system 100 reduces the amount (and therefore the cost) of backend servers or cloud resources required to the use the system 100 by spreading the bandwidth of the data packets 140 to all R-nodes 110 (i.e., devices) within the system 100. Further, the spreading of bandwidth through all R-nodes 110 reduces latency and helps local networks like cell/Wi-Fi/ Bluetooth networks level off bandwidth therefore preventing telecommunications/operators from heavily investing into network surge capacity. Latency will further decrease as the number of R-nodes 110 in the system increase. Therefore, the system 100 does not require the back-end support structure (i.e., multiple servers or large cloud services) as existing broadcast systems. In addition, the mesh-like network created by the system 100 cannot be stopped by traditional internet controlling means and can circumvent internet controls.

Figure 5:
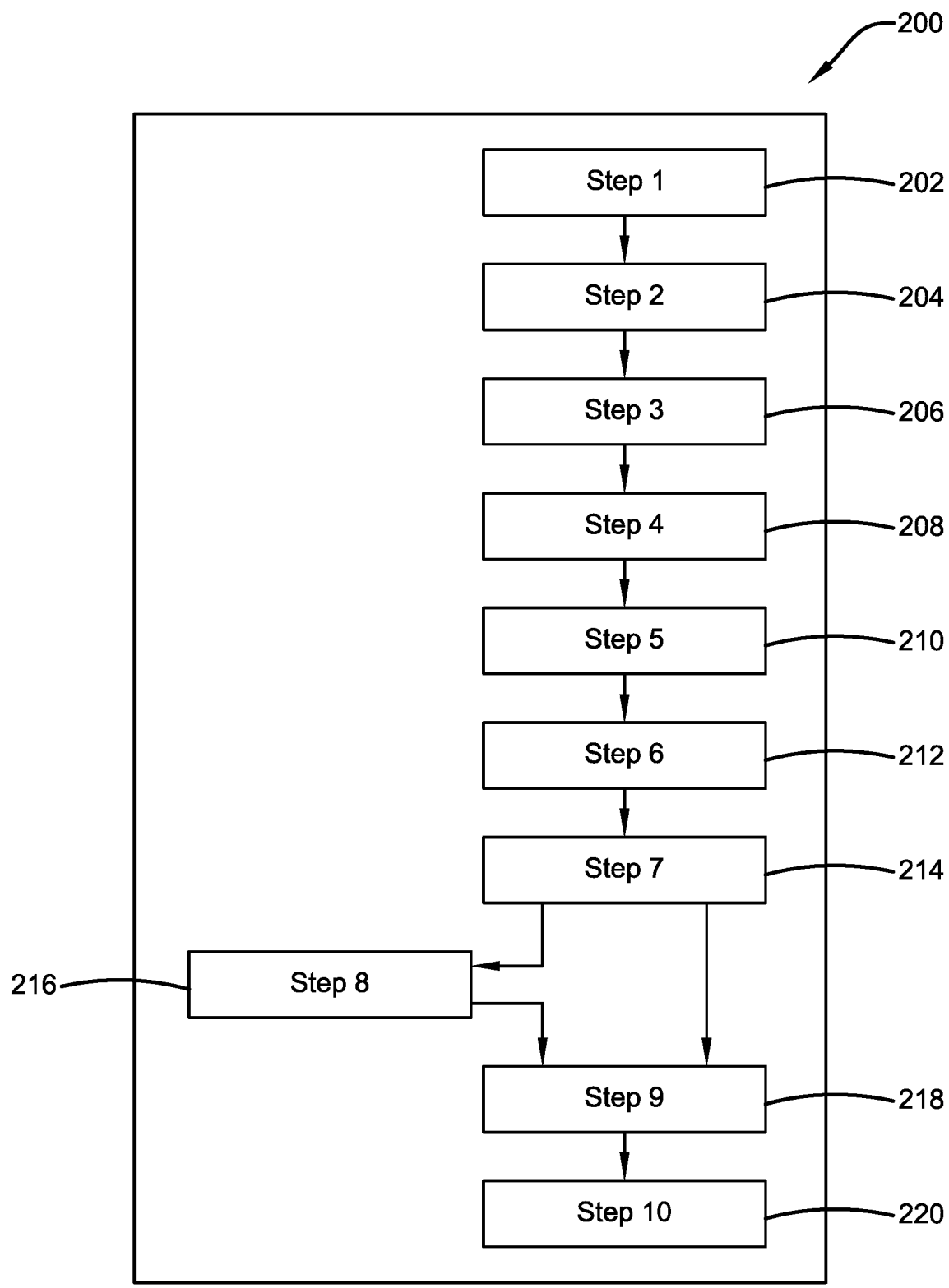
FIG. 5 illustrates a flow chart of one potential method of setting up and using the broadcast VPN system of the present invention in accordance with the disclosed architecture.

FIG. 5 illustrates a flow chart of one potential method 200 of setting up and using the broadcast VPN system 100 of the present invention in accordance with the disclosed architecture. The system 100 may also be comprised of a method of use 200. First, the system 100 can be downloaded via a smart device in the form of software (which may be integrated into a mobile application) [Step 202]. Next, the system 100 registers the smart device with downloaded software to a specific broadcast channel, subscription, or group within the system [Step 204]. Then, the system 100 creates a dynamic database such as an Elastic Search Database [Step 206]. Next, the smart device sends device and dianogstic information such as but not limited to device specifications (memory, processing power, network connections, etc.), all device physical network addresses, location, network latencies (pings to multiple public IP servers), bandwidth of network connected, device created serial number and cipher block key, etc. to the system 100 [Step 208]. The system 100 then registers the smart device to a local group and calculates the new local group density, local group bandwidth, and other system parameters to create an optimal packet division in a continuous manner [Step 210].

Next, the system 100 sends test data packets 140 via the Broadcast Source Server (BSS) 105 to the smart device, wherein the smart device retransmits the test packets 140 to a test R-node 110. The test R-node 110 sends hash to the BSS 105 [Step 212]. If hash is correct, the BSS 105 adds the smart device device to local group R-Nodes database [Step 214]. The BSS 105 then sends a successful message to the system 100 wherein if the message fails, the system 100 retries the setup process until timeout is hit [Step 216]. Once the successful message is verified, new R-node 110 is assigned [Step 218]. It should be noted that once a new broadcast message is sent to the local group, the smart device does not need to be subscribed to the message traffic. If it is subscribed to the message trafficthes smart device recieves all the other packet 140 traffic from the various R-Nodes 110 in the local group [Step 220].

If the smart device is not part of message group (R-Node Null), but part of the local group, it is still part of the system 100. R-Node Null nodes relay the packets 140 based on AI transmission pattern of the AI optimization system. The more R-Nodes in a local group, the more bandwidth is saved, the lower the latency, and the higher the security created by the system. Finally, any R-Node can act as an independent BSS and transmit broadcast information from local devices to a broadcast group with in the LG.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "Broadcast VPN", "VPN system" and "system" are interchangeable and refer to the broadcast VPN system 100 of the present invention.

Notwithstanding the forgoing, the broadcast VPN system 100 of the present invention and its various components can be of any suitable size and configuration as is known in the art without affecting the overall concept of the invention, provided that they accomplish the above-stated objectives. One of ordinary skill in the art will appreciate that the size, configuration and material of broadcast VPN system 100 as shown in the FIGS. are for illustrative purposes only, and that many configurations of the broadcast VPN system 100 are well within the scope of the present disclosure. Although the components of the broadcast VPN system 100 are important design parameters for user convenience, the broadcast VPN system 100 may differ so long as they ensure optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A broadcast virtual private network system comprising:
   a location-based regiment database optimization algorithm;
   a broadcast source server;
   a plurality of repeater nodes within the broadcast source server; and
   a location-based regiment database; and
   wherein the broadcast source server breaks up a data packet that enters the broadcast virtual private network system into a plurality of partial data packets based on a density of the repeater nodes on a broadcast channel; and
   wherein the broadcast source server employs a one-way data directional flow to broadcast the plurality of partial data packets within the system regardless of if a next of the plurality of repeater nodes is known by the broadcast source server.

2. The broadcast virtual private network system of claim 1, wherein the broadcast source server receives a plurality of data from the data packet.

3. The broadcast virtual private network system of claim 2, wherein the plurality of data is received by the plurality of repeater nodes.

4. A broadcast virtual private network system comprising:
   an optimized artificial intelligence algorithm;
   a broadcast source server;
   a plurality of data packets;
   a plurality of repeater nodes within the broadcast source server; and
   a location-based regiment database; and
   wherein the broadcast source server breaks up each data packet that enters the broadcast virtual private network system into a plurality of partial data packets based on a density of the repeater nodes on a broadcast channel; and
   wherein any of the plurality of repeater nodes are reconfigurable as the broadcast source server.

5. The broadcast virtual private network system of claim 4, wherein at a beginning time=1, a first repeater node receives a first partial data packet, a second repeater node receives a second partial data packet, a third repeater node receives a third partial data packet, and a repeater node n receives a partial data packet n.

6. The broadcast virtual private network system of claim 5, wherein the first repeater node transmits the first partial data packet to both the second repeater node and repeater node n based on the optimized artificial intelligence algorithm.

7. The broadcast virtual private network system of claim 6, wherein the second repeater node transmits the second partial data packet to both the third repeater node and the repeater node n based on the optimized artificial intelligence algorithm.

8. The broadcast virtual private network system of claim 7, wherein the third repeater node transmits the third partial data packet to both the second repeater node and the first repeater node based on the optimized artificial intelligence algorithm.

9. The broadcast virtual private network system of claim 8, wherein the repeater node n transmits the partial data packet n to both the first repeater node and the third repeater node based on the optimized artificial intelligence algorithm.

10. The broadcast virtual private network system of claim 4, wherein at a beginning of time=2, a first repeater node transmits a first partial data packet to a third repeater node based on the optimized artificial intelligence algorithm.

11. The broadcast virtual private network system of claim 10, wherein a second repeater node transmits a second partial data packet to the first repeater node based on the optimized artificial intelligence algorithm.

12. The broadcast virtual private network system of claim 11, wherein the third repeater node transmits a third partial data packet to a repeater node n based on the optimized artificial intelligence algorithm.

13. The broadcast virtual private network system of claim 11, wherein the repeater node n transmits a partial data packet n to the second repeater node based on the optimized artificial intelligence algorithm.

14. The broadcast virtual private network system of claim 4, wherein the broadcast virtual private network system performs a data check when a partial data packet is not received by a repeater node of the plurality of repeater nodes.

15. The broadcast virtual private network system of claim 14, wherein the broadcast source server retransmits the partial data packet to the repeater node of the plurality of repeater nodes if it was not received by the repeater node in a first instance.

16. The broadcast virtual private network system of claim 4, wherein the broadcast virtual private network system confirms that each of the plurality of repeater nodes have full broadcast messages from the plurality of data packets.

* * * * *